(12) United States Patent
Tuttle et al.

(10) Patent No.: US 7,487,843 B2
(45) Date of Patent: Feb. 10, 2009

(54) ADJUSTABLE QUICK HITCH

(75) Inventors: Thomas B. Tuttle, Naperville, IL (US);
Jon R. Hagarty, Darien, IL (US)

(73) Assignee: CNH America LLC, New Holland, PA (US)

( * ) Notice: Subject to any disclaimer, the term of this patent is extended or adjusted under 35 U.S.C. 154(b) by 480 days.

(21) Appl. No.: 10/968,631

(22) Filed: Oct. 19, 2004

(65) Prior Publication Data
US 2006/0081382 A1    Apr. 20, 2006

(51) Int. Cl.
*A01B 51/00* (2006.01)
(52) U.S. Cl. ............ 172/272; 172/446; 280/461.1
(58) Field of Classification Search ........ 172/248, 172/272, 275, 439, 446, 448; 280/460.1, 280/461.1
See application file for complete search history.

(56) References Cited

U.S. PATENT DOCUMENTS

| | | | |
|---|---|---|---|
| 3,195,651 A | 7/1965 | Todd | 172/272 |
| 3,231,294 A | 1/1966 | Horney | 280/415 |
| 3,427,046 A * | 2/1969 | Muncke et al. | 172/272 |
| 3,472,528 A * | 10/1969 | Richey et al. | 280/416.2 |
| 3,544,133 A * | 12/1970 | Lemmon et al. | 172/272 |
| 3,561,788 A * | 2/1971 | Carlson et al. | 280/461.1 |
| 3,583,494 A | 6/1971 | Thompson | 172/285 |
| 3,829,128 A * | 8/1974 | Sutton | 172/272 |
| 4,015,855 A * | 4/1977 | Murray | 280/416.2 |
| 4,019,753 A | 4/1977 | Kestel | 280/415 A |
| 4,850,789 A | 7/1989 | Zimmerman | 414/703 |
| 5,026,247 A | 6/1991 | Zimmerman | 414/703 |
| 5,582,255 A | 12/1996 | Nikkel et al. | 172/6 |
| 6,533,042 B1 | 3/2003 | Marine, Sr. et al. | 172/272 |

* cited by examiner

*Primary Examiner*—Thomas B Will
*Assistant Examiner*—Jamie L McGowan
(74) *Attorney, Agent, or Firm*—Patrick M. Sheldrake; John William Stader; Michael C. Harms

(57) ABSTRACT

A quick hitch for a three point hitch for a work machine which is quickly and easily configurable without lifting, in at least two width configurations for connection to a three point hitch of a work machine on one side, and to a work element, such as an implement or the like, on an opposite side, including optionally wherein the three point hitch is in a first width configuration and connectors of the work element are in a second width configuration greater than the first, all without requiring changing the vertical spacing between the connections and a upper center connection.

20 Claims, 7 Drawing Sheets

ADJUSTABLE QUICK HITCH

TECHNICAL FIELD

This invention relates generally to a quick hitch for a three point hitch for a work machine, and more particularly, to a quick hitch which is quickly and easily configurable without lifting, in at least two width configurations for connection to a three point hitch of a work machine on one side, and to a work element, such as an implement or the like, on an opposite side, including optionally wherein the three point hitch is in a first width configuration and connectors of the work element are in a second width configuration greater than the first.

BACKGROUND ART

Adjustable quick hitches for three point hitches for work machines, such as tractors and the like, for connection of work elements thereto, such as implements and the like, are well known. Reference Todd U.S. Pat. No. 3,195,651, issued Jul. 20, 1965, to Massie Ferguson, Inc.; and Marine, Sr. et al. U.S. Pat. No. 6,533,042, issued Mar. 18, 2003, both of which disclose adjustable width quick hitches.

However, the quick hitch of the Todd patent suffers from shortcomings including that changing the width of spacing between hooks for connection to a work element or implement also alters the vertical positions thereof in relation to a center hook of the quick hitch. Also, apparatus for operating latches of the hooks of the quick hitch are located externally, and thus are exposed to environmental conditions including rain, ice, snow, dirt, and dust, and are also subject to possible damage from contact with tractors, implements and the like. Additionally, when the width of the quick hitch is being adjusted, extension members including the hooks for connection to a work element or implement, which can be quite heavy, must be manually raised or lowered. The Todd patent also does not disclose connection between a three point hitch in one width configuration, and a work element or implement in another width configuration, which can be useful and desirable.

Shortcomings of the device of the Marine, Sr. et al. patent include the requirement for a relatively complex and costly mechanism for changing the width configuration of the device, and no apparent capability for accommodating a three point hitch and a work element in different width configurations.

Therefore, what is sought is an adjustable quick hitch for a three point hitch, which overcomes one or more of the shortcomings set forth above, can accommodate connection between a three point hitch and a work element in the same or different width configurations, does not require lifting, and which is economical, and quick and easy to reconfigure.

SUMMARY OF THE INVENTION

What is disclosed is an adjustable quick hitch for a three point hitch for a work machine, which overcomes at least one of the shortcomings set forth above, can accommodate connection between a three point hitch and a work element in the same or different width configurations, does not require lifting to change the configuration thereof, is economical, and quick and easy to reconfigure.

According to a preferred aspect of the invention, the quick hitch includes a generally horizontal elongate cross bar defining a longitudinal direction and having a longitudinal center portion and opposite first and second end portions, the center portion including at least one connector for connecting to a center link of a three point hitch and a hook for receiving and holding a pin of a work element. The quick hitch includes a first leg having an upper portion supported on the first end portion of the cross bar for slidable movement longitudinally therealong, and a second leg having an upper portion supported on the second end portion of the cross bar for slidable movement longitudinally therealong. The quick hitch also preferably includes cooperatively engageable elements for fixing the first and second legs at at least two predetermined longitudinal positions on the first and second end portions of the cross bar, respectively. Each of the legs extends downwardly from the upper portion thereof to a lower portion thereof, the lower portion of each of the legs including at least one connector for connection to a lift arm of a three point hitch, and a hook for receiving and holding a pin of a work element to be coupled to the quick hitch. Each of the legs also preferably has a latch disposed adjacent to the hook and operably movable between a latched position for holding a pin in the hook and an unlatched position for allowing passage of a pin into and out of the hook, each of the legs additionally including a handle mounted on the upper end thereof above the end portion of the cross bar. Each of the legs and the end portions of the cross bars preferably includes passages therethrough in which an actuating rod extends operatively connecting the latch of the leg with the handle thereof such that the handle can be moved for operatively moving the latch between the latched and the unlatched positions, the passages through the end portions of the cross bar each having a sufficient longitudinal extent and being unobstructed such that the rods are movable longitudinally therethrough as the legs are moved longitudinally along the end portions, respectively.

According to another preferred aspect of the invention each of the end portions of the cross bar has a predetermined transverse sectional shape and size, and the upper portions of the legs each include a sleeve defining a longitudinal passage therethrough which has a transverse sectional shape corresponding to the transverse sectional shape of the cross bar and a transverse size marginally larger than the transverse size of the cross bar, such that the end portions of the legs cooperatively receive and are slidably along the end portions of the cross bar, respectively. According to another preferred aspect, the passages through the end portions of the cross bar through which the actuating rods extend each contain a biasing element operable in cooperation with the actuating rod for urging the latch toward the latched position and when the latch is in the latched position for resiliently yieldably holding the latch in the latched position. Further, the passages through the end portions of the cross bar through which the actuating rods extend each preferably include a longitudinally extending slot through at least an upper wall of the cross bar.

According to another preferred aspect of the invention, the at least one connector of the lower portions of the legs each include a first connector substantially aligned with the hook of the leg and a second connector longitudinally inwardly of the first connector. One of the connectors can be optionally removably mounted on the leg, so as to be removable when not required.

According to another preferred aspect, the cooperatively engageable elements for fixing the first and second legs at at least two predetermined longitudinal positions on the first and second end portions of the cross bar, respectively, include sets of transverse holes through the upper portions of the legs and through the end portions of the cross bar alignable for cooperatively receiving bolts therethrough. The legs are also positionable at longitudinally outermost positions on the cross bar such that longitudinal inner sides of the hooks thereof are spaced longitudinally between about 960 mm and about 980 mm apart, and such that vertical centers of at least two of the connectors are spaced between about 820 mm and about 840 mm apart. This enables coupling the hooks to pins of a work element in an offset relation to lift arms of a work machine connected to the connector. Such configurations can comprise, for instance, a conventional ASAE Category III configuration and an ASAE Category IIIN configuration of a three point hitch, respectively. At the same time, the hooks can be configured in a spaced apart relation for connection to pins of a work element or implement, also in either of two configurations, for instance, either a Category III or Category IIIN configuration. Thus, as an option, the quick hitch can be connected to a three point hitch in a Category IIIN configuration, while being coupled to a work element or implement in either a Category III or IIIN configuration. More particularly, the three point hitch can be in either a Category III or Category IIIN configuration, and the work element or implement can be in a category III or category IIIN configuration, it thus being apparent that it is not required that the work element and three point hitch being in the same configuration category.

DETAILED DESCRIPTION OF THE INVENTION

Figure 1:
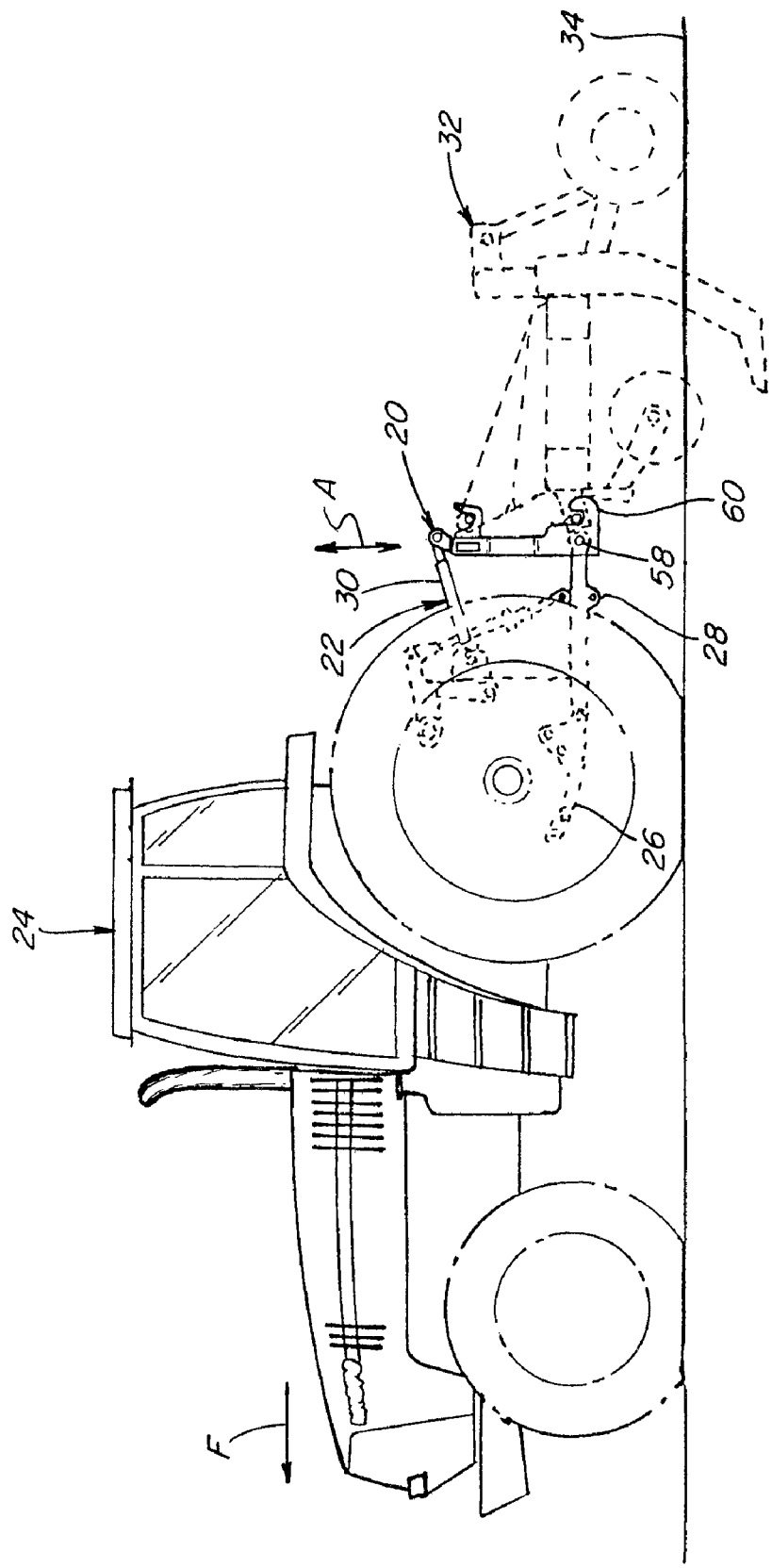
FIG. 1 is a side view of a tractor having a three point hitch on a rear end thereof connected to an adjustable quick hitch of the invention, and a representative work element which is an agricultural implement coupled to the quick hitch.
Figure 2:
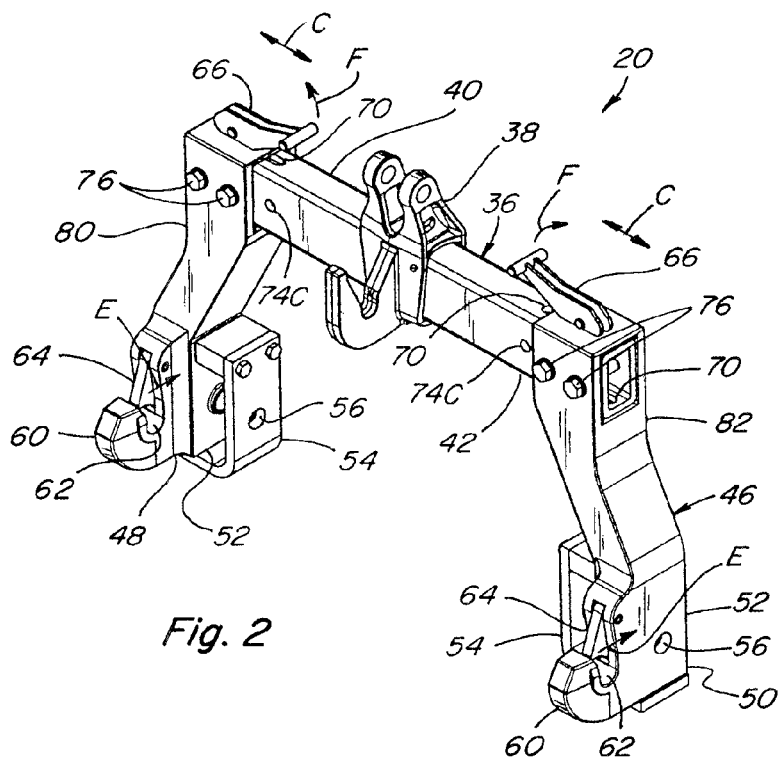
FIG. 2 is a perspective view of the adjustable quick hitch of FIG. 1.
Figure 3:
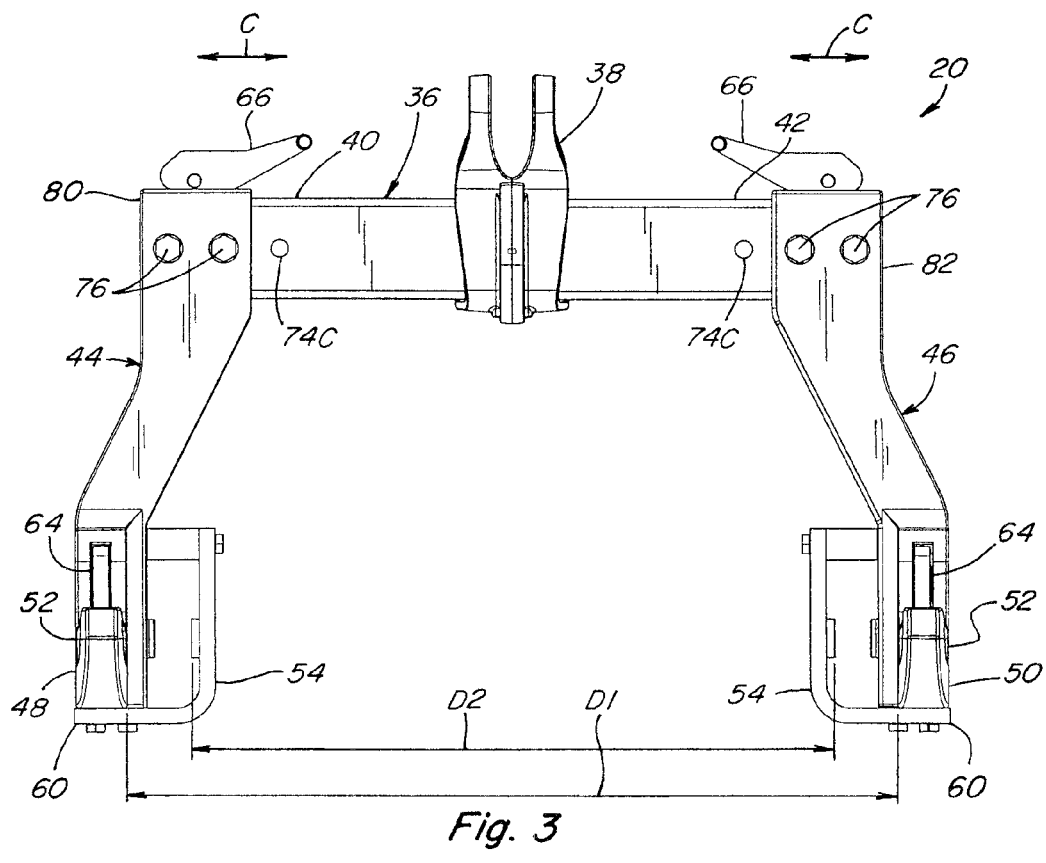
FIG. 3 is a rear end view of the quick hitch of FIG. 1.

Referring now to the drawings, in FIGS. 1, 2 and 3, a quick hitch 20 constructed and operable according to the teachings of the present invention, is shown. Quick hitch 20 is adapted for connection to a variety of well known, commercially available three point hitches commonly found on work machines, such as tractors for agricultural, construction and other purposes, such as, but not limited to, three point hitch 22 on agricultural tractor 24.

Tractor 24 is of conventional construction and operation, and includes a rear end 26 on which three point hitch 22 is mounted. Three point hitch 22 includes a pair of rearwardly extending lift arms at lower, sideward locations, represented by a left lift arm 28, and a rearwardly extending center link 30, at an upper center location. Each of the links, represented by links 28 and 30, are variable in length, and controllably movable upwardly and downwardly during operation, as denoted by arrow A in FIG. 1. A three point hitch, such as hitch 22, is adapted for pinned connection to a work element, such as implement 32, either directly, or using a quick hitch such as quick hitch 20, to be towed by tractor 24 as it moves forwardly, as denoted by arrow F, over a surface, such as ground surface 34, shown in FIG. 1. If connection of a work element such as implement 32 directly to the three point hitch is desired, careful placement of the tractor, and often adjustment of the length of one or more of the lift arms and the center link, will be required, resulting in a time consuming operation. An operator may be required to change work elements or implements frequently enough such that significant amounts of time can be required. As a result of the time requirements for attachment of work elements directly to three point hitches, such as hitch 22, quick hitches have come into widespread use. A quick hitch, such as quick hitch 20, can be left on the three point hitch, and it can be coupled to, and uncoupled from, a work element such as implement 32 in a fraction of the time typically required to connect directly to a three point hitch and disconnect therefrom. As a result, a substantial amount of time is saved. A quick hitch is typically an inverted U or other shaped structure which includes forwardly facing elements for connection to the three point hitch, and rearwardly facing elements which are positioned and operable for quickly and easily coupling to, and uncoupling from, a work element, such as implement 32. Here, it should be noted that quick hitch 20 is not limited to use on a rear end of a work machine, but can also be mounted on a front end of a machine, and, as a result, the term "front", "forward" and "rear" are not to be construed as limiting the invention.

Figure 3A:
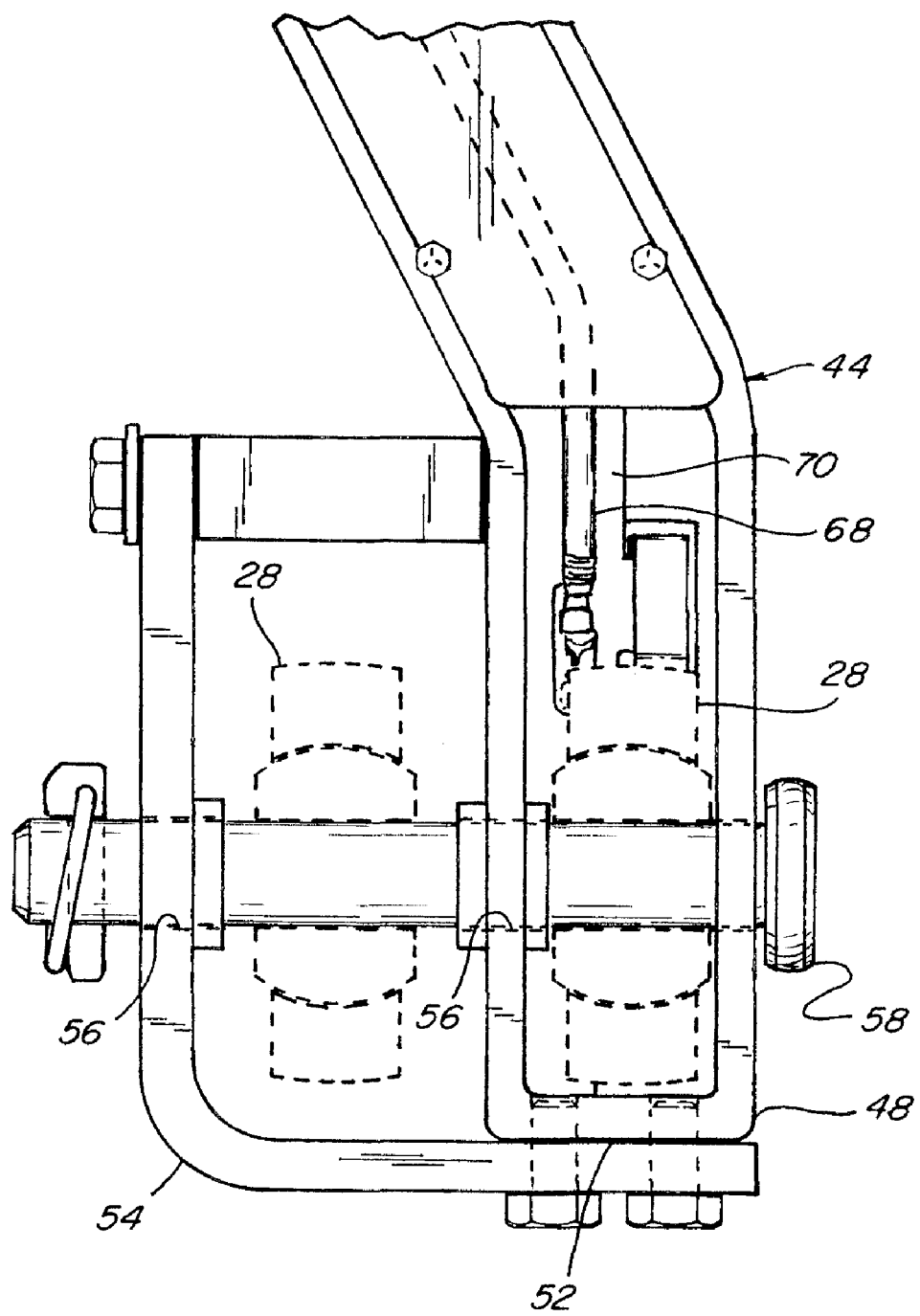
FIG. 3A is a fragmentary front end view of a leg of the quick hitch, illustrating options for connection of lift arms of a three point hitch thereto.
Figure 4:
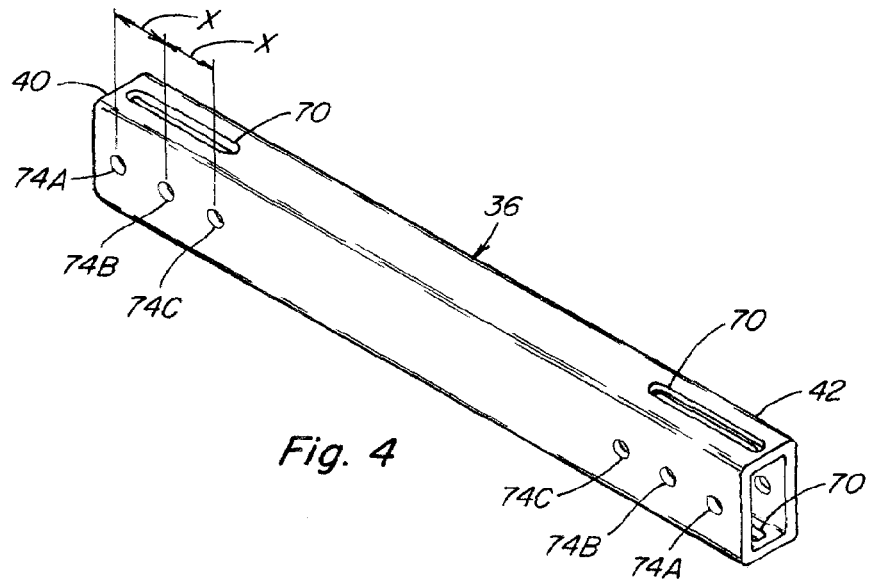
FIG. 4 is a perspective view of a cross bar of the quick hitch.

Referring more particularly to FIGS. 2 and 3, and also to FIGS. 3A and 4, quick hitch 20 includes a generally horizontally extending elongate upper member or cross bar 36, at a longitudinally center location on which is mounted a center pin connection or center clevis and hook member 38, for pinned connection to a center link, such as center link 30 (FIG. 1), of a three point hitch, and coupling to a pin of a work element, both in the well known customary manner. Cross bar 36 includes longitudinally opposite first and second end portions 40 and 42, on which a first leg 44 and a second leg 46 are supported for slidable longitudinal movement, as denoted by arrows C. Legs 44 and 46 extend downwardly from cross bar 36 to form a generally inverted U shape structure. Legs 44 and 46 include lower end portions 48 and 50, respectively, each of which preferably includes a pair of side-by-side connectors 52 and 54, each of which is preferably a clevis, including aligned holes 56 extending in the longitudinal direction therethrough, adapted for receiving a clevis pin 58, for pivotal pinned connection to a lift arm of three point hitch 22, represented by left lift arm 28. Referring more particularly to FIG. 3, it should be observed that connectors 54 are located longitudinally inwardly relative to connectors 52, that is, closer to center clevis and hook member 38, compared to connectors 52. As will be explained, this is to provide a capability for accommodating connection to the lift arms of a three point hitch in at least two different spaced apart configurations or categories. Connectors 54 are also shown as being bolted onto legs 44 and 46, to allow optional removal, if desired.

Additionally, each lower end portion 48 and 50 of legs 44 and 46, respectively, includes a hook coupler 60 on a transverse side thereof with respect to the longitudinal direction of cross bar 36 opposite connector 52, for cooperatively receiving and holding a pin, such as a clevis pin 58 for coupling to a lower member of a work element, such as implement 32 shown in FIG. 1. Each hook coupler 60 defines a receptacle 62 which is upwardly open and is adapted for cooperatively receiving a pin, such as a clevis pin 58, of a work element, such as implement 32, for coupling the work element or implement to quick hitch 20, for relative pivotal movement therebetween about a longitudinal axis extending through receptacles 62. Each coupler 60 preferably includes a latch 64 movable between a latched position, illustrated by arrows E in FIG. 2, for holding a pin in receptacle 62, and an unlatched position at least largely retracted into lower end portion 48 or 50 for allowing passage of a pin into or out of receptacle 62. Each latch 64 is manually movable between its latched and unlatched positions by moving a handle 66 located on an upper surface of leg 44 or 46 between a latched position (shown) and an unlatched position pivoted upwardly relative to the latched position, illustrated by arrows F in FIG. 2.

Figure 5:
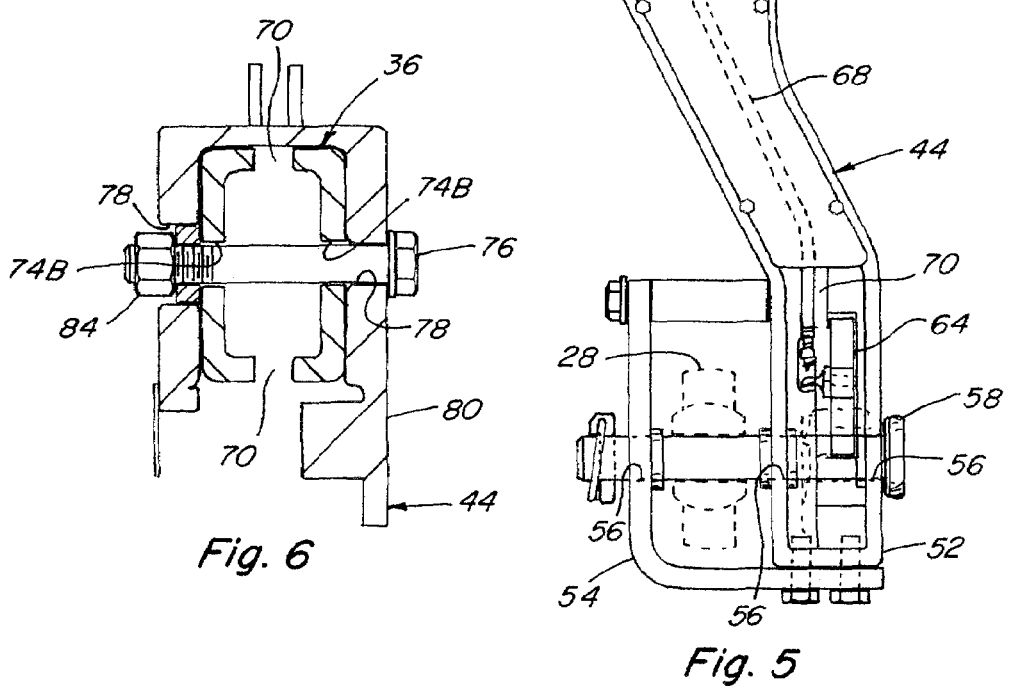
FIG. 5 is an enlarged fragmentary front end view of the adjustable quick hitch.
Figure 6:
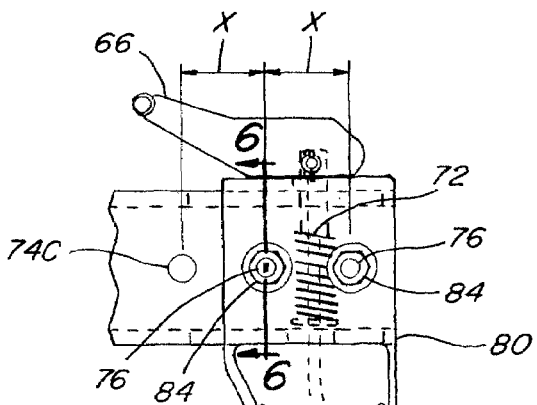
FIG. 6 is a section along line 6-6 of FIG. 5.

Referring also to FIGS. 5 and 6, connection of handles 66 to latches 64 is made by actuator rods 68 which extend through passages 70 through legs 44 and 46, and through end portions 40 and 42 of cross bar 36. Here, resiliently yieldable biasing elements, represented by coil springs 72 around upper ends of actuator rods 68, are utilized to apply a resilient biasing force against rods 68 for urging them toward the latched position when in the unlatched position. Each spring 72 is preferably located in a portion of passage 70 within the end portion 40 or 42 of cross bar 36, and will bear upwardly against an upper inner surface of the cross bar when the spring is biasing rod 68 downwardly toward its latched position.

Figure 7:
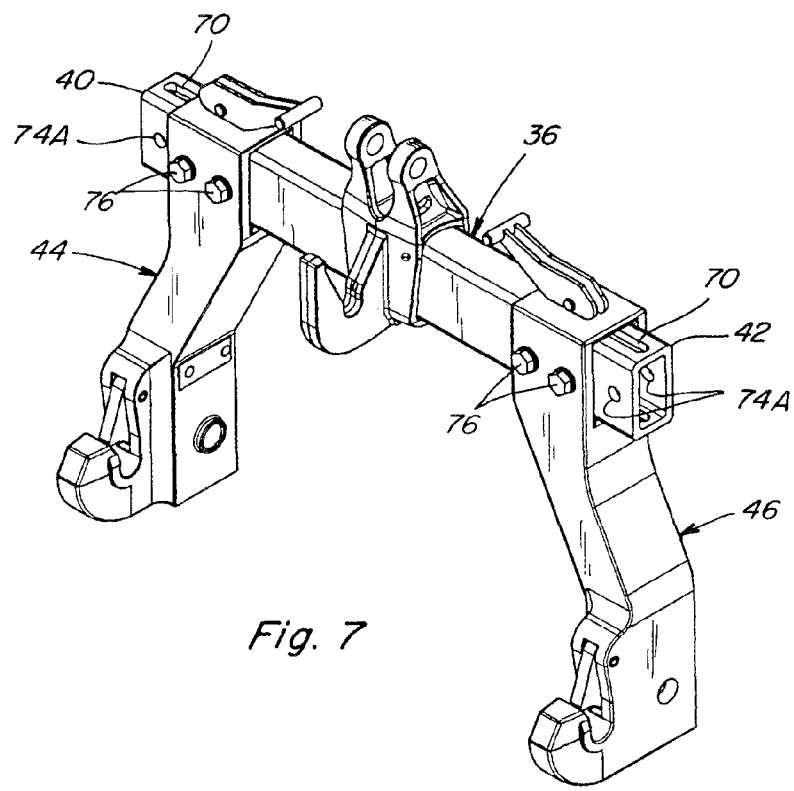
FIG. 7 is a perspective view of the quick hitch of FIG. 1, with legs thereof in alternative longitudinal positions on the cross bar thereof.
Figure 8:
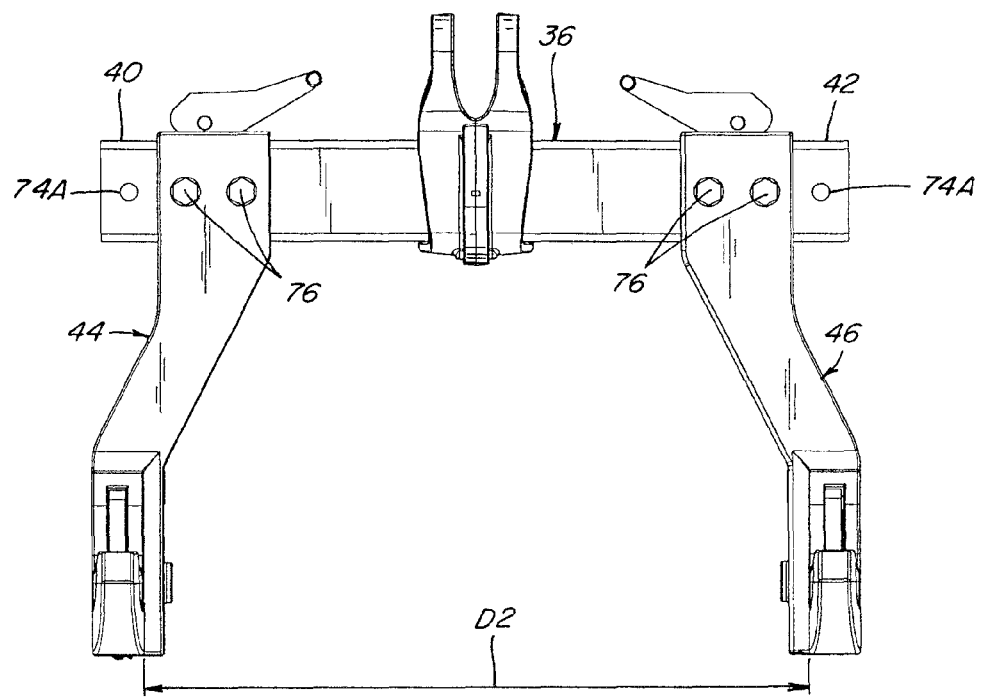
FIG. 8 is a rear end view of the hitch of FIG. 7.

Here also it should be noted that quick hitch 20 is shown in FIGS. 2, 3 and 5 in a longitudinally expanded configuration, that is, wherein first and second legs 44 and 46 are positioned at their longitudinal outermost locations on first and second end portions 40 and 42 of cross bar 36. Legs 44 and 46 are slidably movable between this position, and a second longitudinally inward position, shown in FIGS. 7 and 8. Thus, the width of the space between spaced apart connectors 52 and 54 on the respective ones of legs 44 and 46 can be changed, by the slidable horizontal longitudinal movement of legs 44 and 46 on cross bar 36. To facilitate this slidable movement and also passage of actuator rod 68 through end portions 40 and 42 of cross bar 36, passage 70 through each of the end portions of the cross bar take the form of elongate slots in upper and lower surfaces of the cross bar. As a result, shaft 68, with spring 72 therearound, can be moved longitudinally with leg 44 or 46, while being contained and protected so as to be less subject to environmental conditions, such as moisture, ice, dirt and dust, and also potential contact with and resulting damage from tractors and other machinery.

Referring also FIG. 6, cross bar 36, more particularly includes holes 74A, 74B and 74C through opposite transversely facing and surfaces of first and second end portions 40 and 42 thereof. Adjacent ones of holes 74A, 74B and 74C on each end portion 40 and 42 of cross bar 36 are spaced a predetermined distance apart, as denoted by distances X, so as to be alignable with aligned holes 78 (FIG. 6) through first and second upper end portions 80 and 82 of legs 44 and 46 spaced apart by a corresponding distance, denoted by arrows X in FIG. 5, for receiving a bolt 76 securable with a nut 84, for securing legs 44 and 46 to cross bar 36 at one of two predetermined positions, such that couplers 60 will be a first predetermined distance apart, as denoted by distance D1 in FIG. 3, or a second predetermined distance apart, as denoted by distance D2 in FIG. 8. Predetermined distances D1 and D2, in this instance, are preferably equal to the distances for ASAE Category III and Category IIIN (narrow) hitches. Distance D1 and D2 also correspond to the distance between connectors 52 on legs 44 and 46 for connection to a three point hitch, in either a Category III or Category IIIN configuration. Additionally, when legs 44 and 46 are in their outermost longitudinal positions, such that couplers 60 and connectors 52 are spaced the distance D1 apart (FIG. 3), connectors 54 are spaced the distance D2 apart. This enables coupling to a work element, such as implement 32, in a Category III configuration, and connecting connectors 54 to lift arms of a three point hitch, such as three point hitch 22, in a Category IIIN configuration, which can be advantageous. Here, the nominal width between hooks or connections for a Category III hitch is about 969.78 to 975.36 mm, or about 38.18 to 38.40 inches, and the nominal width for a Category IIIN hitch is about 828.56 to 834.13 mm, or about 32.62 to 32.84 inches, it thus being satisfactory for distance D1 to be from about 960 mm to about 980 mm, and for distance D2 to be from about 820 mm to about 840 mm. Other configurations can also be used.

In regard to advantages, having the ability to connect to a three point hitch, such as hitch 22 of tractor 24, in a narrower configuration, for instance using connectors 54 in a Category IIIN configuration, while coupling to a work element, such as implement 32, in a wider configuration, such as in a Category III configuration, using couplers 60, can provide an advantage of allowing narrower spacing between tires on opposite sides of a work machine, such as tractor 24, for accommodating a particular crop row spacing in an agricultural field.

Figure 9:
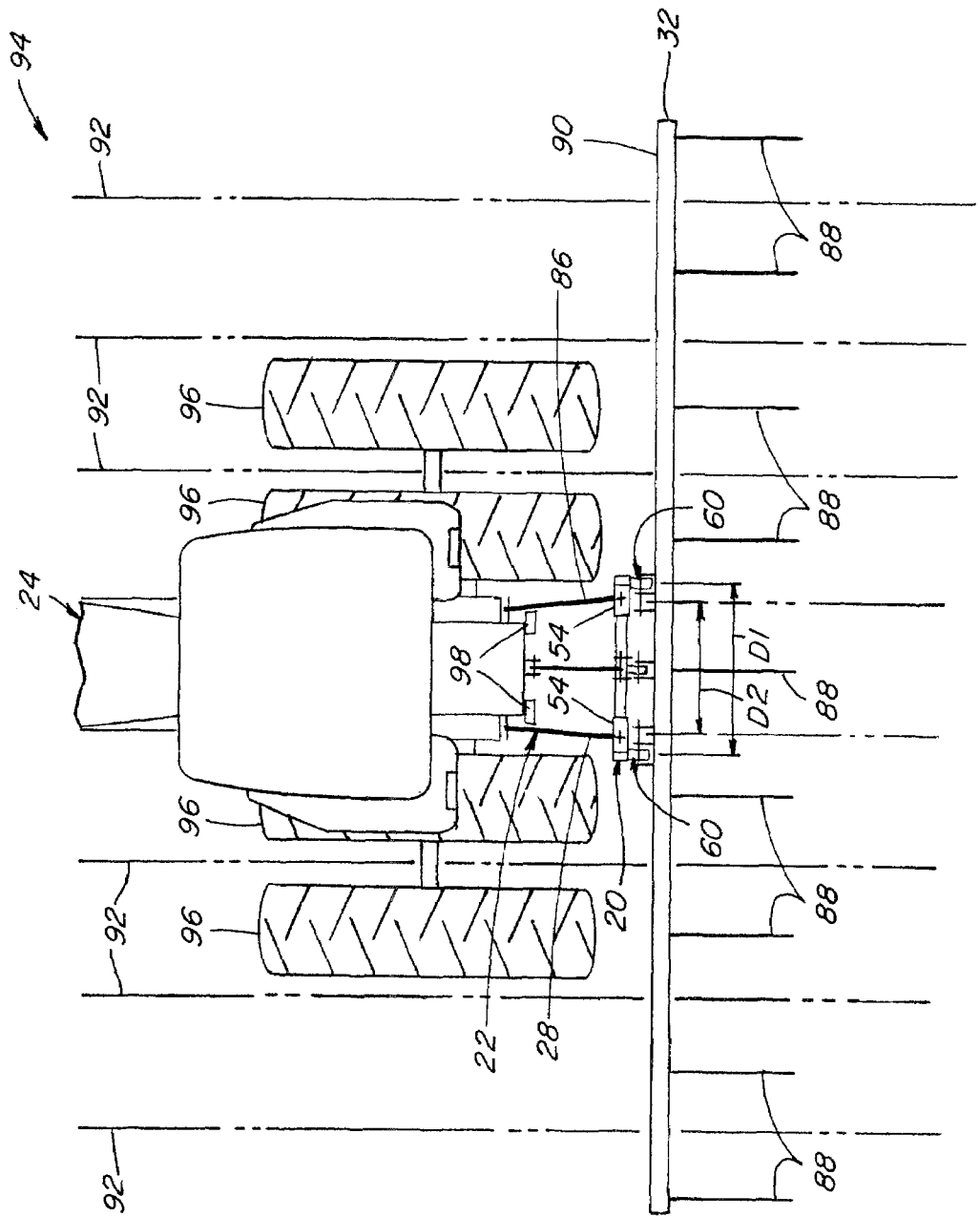
FIG. 9 is a simplified fragmentary top view of a tractor on an agricultural field and including a quick hitch of the invention connected to a three point hitch thereof, and coupled in one configuration to a work element which is an agricultural implement.
Figure 10:
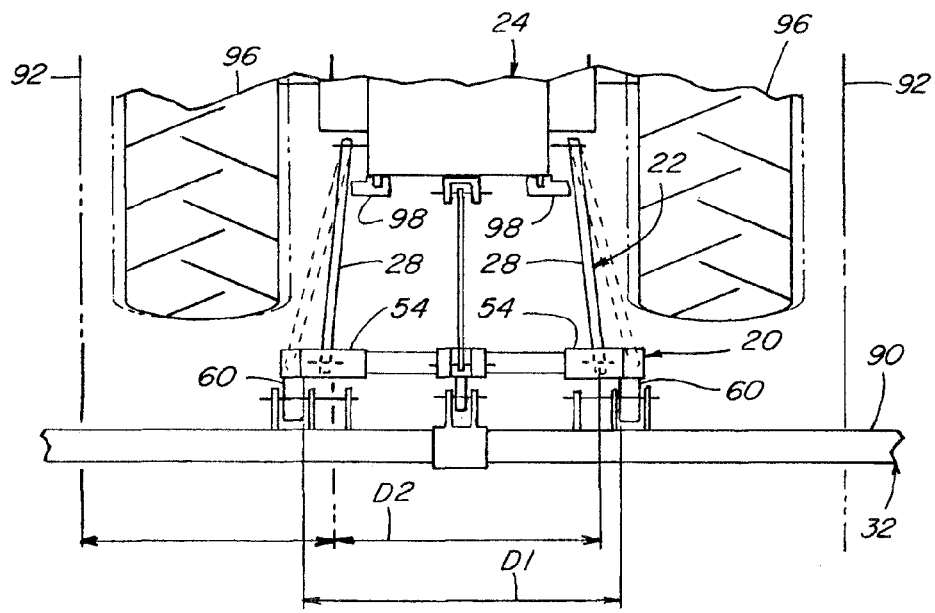
FIG. 10 is another fragmentary top view of a tractor in a field, showing a three point hitch connected in another configuration to a quick hitch of the invention shown also coupled to an agricultural implement.

As an example, referring also to FIGS. 9 and 10, the advantage of the capability of connecting lift arms 28 and 86 of a three point hitch 22 of a tractor 24 to inner connectors 54 of quick hitch 20 spaced the distance D2 apart corresponding to a Category IIIN configuration, while an implement 32 is coupled to couplers 60 spaced distance D1 apart in a Category III configuration, is illustrated. Here, implement 32 is representative of a row crop cultivator which has a plurality of tools 88 supported in longitudinally spaced apart rotation on a tool bar 90. Tools 88 are intended to be towed between crop rows 92 of an agricultural field 94. It is also desirable for each of tires 96 of tractor 94 to be capable of traveling along a center line between two rows, as shown. Crop rows 92 are illustrative of 30 inch row spacings, which are used for a wide variety of crops, but it should also be noted that a wide variety of other row spacings can be used, including, but not limited to, 38 inch and 20 inch spacings. Tractor tires, such as tires 96 will typically have a width of either about 18.4 inches (shown in solid lines) or about 20.8 inches (FIG. 10, phantom lines). Thus, with the illustrated crop row spacings of 30 inches as shown, to maintain tires 96 centered between adjacent rows, center lines of innermost ones of tires 96 would be located about 60 inches apart. If 20.8 inch wide tires are used, the resulting space between the inner rear edges thereof would be slightly less than 40 inches. This is marginally more than the nominal value for the width of a Category III hitch (38.3 inches), such that if quick hitch 20 were attempted to be connected in that configuration, to lift arms 28 and 86 using tires of that width, interference or at least contact with innermost tires 96 would most likely occur. If the narrower 18.4 inch tires are used, interference is not as likely, particularly if sway blocks 98 are utilized on the rear end of tractor 24, but contact between the tires and the lift arms can still occur. For instance, if cultivating with implement 32 while traveling sidewardly along a hill such that tractor 24 may draft to the downhill side relative to implement 32. Thus, the situation is evident wherein a rather wide implement to provide good productivity is desired to be used with a tractor having relative narrow tire spacing. This problem is solved by providing the capability for connecting quick hitch 20 to lift arms 28 and 86 in the narrower spaced apart configuration, denoted by distance D2, while connecting to implement 32 in a wider configuration, denoted by distance D1.

Figure 11:
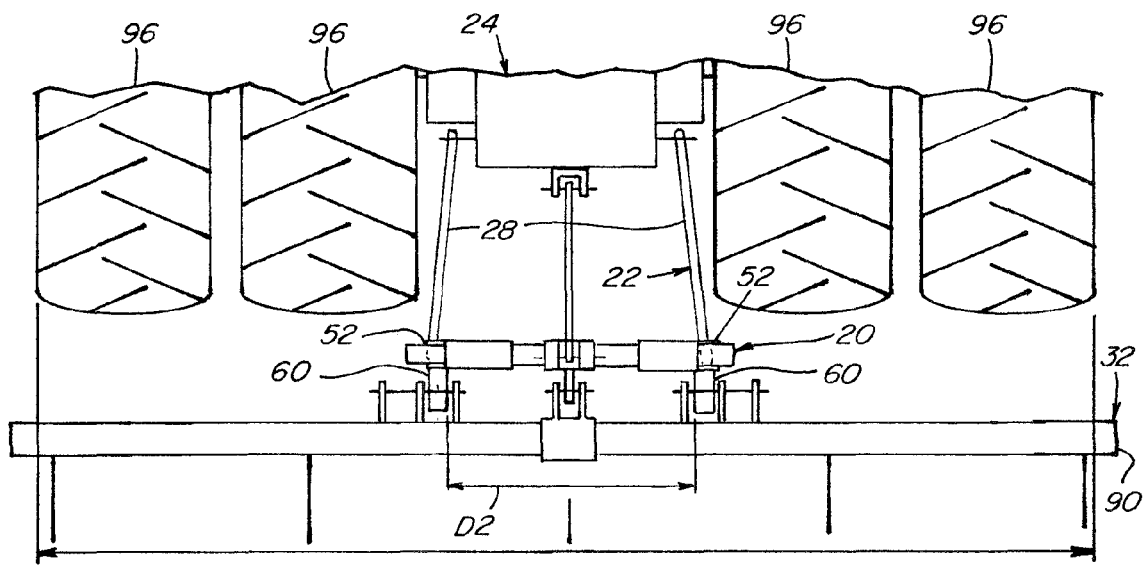
FIG. 11 is another fragmentary top view of a tractor including a three point hitch connected in a configuration to a quick hitch of the invention, and showing an agricultural implement coupled to the quick hitch.

In FIG. 11, a different configuration is shown, wherein quick hitch 20 is shown in its narrow configuration with both connectors 52 and couplers 60 distance D2 apart, and coupled to lift arms 28 and 86 of three point hitch 22, and to a heavy duty tool bar 90 which would represent an implement such as a subsoiler or heavy tillage tool as shown in FIG. 1. Here, because of the depth of penetration of the subsoiler into the ground, tool bar 90 of implement 32 is shorter. However, it requires a great deal of power to pull through the ground, therefore, dual tires 96 are utilized in a relatively close together configuration, row spacing not being a factor in this instance. To accommodate such narrow tire spacings, lift arms 28 and 86 of three point hitch 22 are desirably spaced the narrower distance D2 apart as shown. Also, because tool bar 32 is relatively short, couplers 60 can be coupled thereto also in the narrower spaced apart D2 distance, both corresponding to the Category III configuration.

As a result of review of the above examples, it should be apparent that quick hitch 20 of the invention can be configured for connection to both a three point hitch and a work element such as implement 32 in a narrower configuration, represented by distance D2, or in a wider configuration represented by distance D1, or it can be connected to a three point hitch in a narrower configuration, and connected to a work element in a wider configuration, as desired or required for a particular application. Such different combinations of configurations can include the ASAE Category III and IIIN configurations discussed above, and also other configurations which can include, but are not limited to, a Category IVN (925 to 930 mm) and a Category III combination. Advantageously, as is apparent from the above explanation, the legs of quick hitch 20 can be easily and quickly moved between their longitudinally inner and outer positions, without removal and without heavy lifting.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. An adjustable quick hitch for a three point hitch for a work machine, comprising:
    a generally horizontal elongate cross bar defining a longitudinal direction and having a longitudinal center portion and opposite first and second end portions, the center portion including at least one connector for connecting to a center link of a three point hitch and a hook for receiving and holding a pin of a work element;
    a first leg having an upper portion supported on the first end portion of the cross bar for slidable movement longitudinally therealong;
    a second leg having an upper portion supported on the second end portion of the cross bar for slidable movement longitudinally therealong;
    cooperatively engageable elements for fixing the first and second legs at at least two predetermined longitudinal positions on the first and second end portions of the cross bar, respectively; and
    each of the legs extending downwardly from the upper portion thereof to a lower portion thereof, the lower portion of each of the legs including at least one connector for connection to a lift arm of a three point hitch, a hook for receiving and holding a pin of a work element to be coupled to the quick hitch, and a latch disposed adjacent to the hook and operably movable between a latched position for holding a pin in the hook and an unlatched position for allowing passage of a pin into and out of the hook, each of the legs including a handle mounted on the upper end thereof above the end portion of the cross bar, and each of the legs and the end portions of the cross bars including passages therethrough in which an actuating rod extends operatively connecting the latch of the leg with the handle thereof such that the handle can be moved for operatively moving the latch between the latched and the unlatched positions, the passages through the end portions of the cross bar each having a sufficient longitudinal extent and being unobstructed such that the rods are movable longitudinally therethrough as the legs are moved longitudinally along the end portions, respectively.

2. The quick hitch of claim 1, wherein each of the end portions of the cross bar has a predetermined transverse sectional shape and size, and the upper portions of the legs each include a sleeve defining a longitudinal passage therethrough which has a transverse sectional shape corresponding to the transverse sectional shape of the cross bar and a transverse size marginally larger than the transverse size of the cross bar, such that the end portions of the legs cooperatively receive and are slidably along the end portions of the cross bar, respectively.

3. The quick hitch of claim 1, wherein the passages through the end portions of the cross bar through which the actuating rods extend each contain a biasing element operable in cooperation with the actuating rod for urging the latch toward the latched position and when the latch is in the latched position for resiliently yieldably holding the latch in the latched position.

4. The quick hitch of claim 1, wherein the passages through the end portions of the cross bar through which the actuating rods extend each comprise a longitudinally extending slot through at least an upper wall of the cross bar.

5. The quick hitch of claim 1, wherein the lower portions of the legs each include two of the connectors at different longitudinal locations, for connection to lift arms of a three point hitch in at least two spaced apart configurations.

6. The quick hitch of claim 1, wherein the at least one connector of the lower portions of the legs each comprise a first connector substantially aligned with the hook of the leg and a second connector longitudinally inwardly of the first connector.

7. The quick hitch of claim 1, wherein the cooperatively engageable elements for fixing the first and second legs at at least two predetermined longitudinal positions on the first and second end portions of the cross bar, respectively, comprise sets of transverse holes through the upper portions of the legs and through the end portions of the cross bar alignable for cooperatively receiving bolts therethrough.

8. The quick hitch of claim 1, wherein the legs are positionable at longitudinally outermost positions on the cross bar such that vertical inner edges of the hooks thereof are spaced longitudinally between about 960 mm and about 980 mm apart, and such that vertical centers of at least two of the connectors are spaced between about 820 mm and about 840 mm apart.

9. The quick hitch of claim 1, wherein the hook of the lower end portion of each of the legs is offset longitudinally from at least one of the at least one connector thereof, to enable coupling the hook to a pin of a work element in an offset relation to a lift arm of a work machine connected to the connector.

10. The quick hitch of claim 1, wherein the cooperatively engageable elements for fixing the first and second legs at at least two predetermined longitudinal positions on the first and second end portions of the cross bar, respectively, comprise three holes extending transversely through each of the end portions of the cross bar at equally spaced longitudinal positions thereon, and two transverse holes through the upper ends of the legs at correspondingly equally spaced longitudinal positions thereon, such that the legs can be slidably positioned on the end portions of the cross bar with the two holes through the legs aligned with two of the three holes through the end portions, and pins or bolts passed through the aligned holes for fixing the legs on the cross bar.

11. The quick hitch of claim 1, wherein the at least one connector of the lower portions of the legs each comprise a first connector substantially aligned with the hook of the leg and a second connector longitudinally offset from the first connector, the second connector being removably mounted on the leg.

12. An adjustable quick hitch for mounting on a three point hitch of a work machine, comprising:

An inverted U shape structure including a generally horizontal elongate cross bar defining a longitudinal direction and having a longitudinal center portion and opposite first and second end portions, the center portion including at least one connector facing in a first transverse direction for connection to a center link of a three point hitch and a hook facing in an opposite second transverse direction for receiving and holding a pin of a work element, a pair of legs supported on the end portions of the cross bar for slidable movement longitudinally and horizontally therealong, respectively, each of the legs having a lower portion including at least two connectors comprising clevises facing in the first transverse direction and configured for connection to a lift arm of a three point hitch, respectively, in at least two spaced apart configurations, and a hook facing in the second transverse direction for receiving and holding a pin of a work element, the hook being offset in the longitudinal direction from at least one of the two connectors to enable a pin of a work element held by the hook to be longitudinally offset from a lift arm connected to said at least one of the connectors, wherein the legs are slidable longitudinally along the end portions of the cross bar while being supported thereby, to two predetermined longitudinal positions wherein the hooks and the connectors of the legs are spaced first and second predetermined distances apart, respectively, and elements for fixedly holding the legs in the two longitudinal positions, wherein each of the legs includes a latch disposed adjacent to the hook and operably movable between a latched position for holding a pin in the hook and an unlatched position for allowing passage of a pin into and out of the hook, each of the legs including a handle mounted on the upper end thereof above the end portion of the cross bar, and each of the legs and the end portions of the cross bars including passages therethrough in which an actuating rod extends operatively connecting the latch of the leg with the handle thereof such that the handle can be moved for operatively moving the latch between the latched and the unlatched positions, the passages through the end portions of the cross bar each having a sufficient longitudinal extent such that the rods are movable longitudinally therethrough as the legs are moved longitudinally along the end portions, respectively.

13. The quick hitch of claim 12, wherein the at least two connectors are disposed at different longitudinal locations, for connection to lift arms of a three point hitch in at least two spaced apart configurations when the legs are at each of the longitudinal positions on the cross bar.

14. The quick hitch of claim 12, wherein the at least two connectors of the lower portions of the legs each comprise a first connector substantially aligned with the hook of the leg and a second connector longitudinally offset from the first connector, the second connector being removably mounted on the leg.

15. The quick hitch of claim 12, wherein when the legs are positioned at the first position on the cross bar inner edges of the hooks are spaced longitudinally between about 960 mm and about 980 mm apart for coupling to pins of a work element spaced apart in a first configuration, and inner edges of two of the connectors are spaced longitudinally between about 820 mm and about 840 mm apart for connection to lift arms spaced apart in a second configuration closer together than the first configuration.

16. The quick hitch of claim 12, further comprising cooperatively engageable elements on the legs and on the cross bar for fixing the legs at the two positions on the cross bar, respectively, the cooperatively engageable elements each including sets of transverse holes at predetermined locations through the upper portions of the legs and through the end portions of the cross bar for receiving bolts or pins therethrough.

17. The quick hitch of claim 12, wherein each of the end portions of the cross bar has a predetermined transverse sectional shape and size, and the upper portions of the legs each include a sleeve defining a longitudinal passage therethrough which has a transverse sectional shape corresponding to the transverse sectional shape of the cross bar and a transverse size marginally larger than the transverse size of the cross bar, such that the end portions of the legs cooperatively receive and are slidably along the end portions of the cross bar, respectively.

18. An adjustable quick hitch for mounting on a three point hitch of a work machine, comprising:

An inverted U shape structure including a generally horizontal elongate cross bar defining a longitudinal direction and having a longitudinal center portion and opposite first and second end portions, the center portion including at least one connector facing in a first transverse direction for connection to a center link of a three pint hitch and a hook facing in an opposite second transverse direction for receiving and holding a pin of a work element, a pair of legs supported on the end portions of the cross bar for slidable movement longitudinally and horizontally therealong, respectively, the legs having lower portions each including at least two connectors facing in the first transverse direction at different longitudinal positions and being configured so as to be individually connectable to a lift arm of a three point hitch, and each of the lower portions including a hook facing in the second transverse direction for receiving and holding a pin of a work element, the hook being offset in the longitudinal direction from at least one of the connectors, the legs being slidable longitudinally along the end portions of the cross bar while being supported thereby, to at least two predetermined longitudinal spaced apart positions wherein the hooks and the connectors of the legs are spaced different distances apart, respectively, such that at each of the spaced apart positions of the legs lifts arms of a three point hitch are selectably connectable to the connectors in at least two different spaced apart configurations, including a configuration wherein the lift arms are offset longitudinally from the hooks, wherein each of the legs includes a latch disposed adjacent to the hook and operably movable between a latched position for holding a pin in the hook and an unlatched position for allowing passage of a pin into and out of the hook, each of the legs including a handle mounted on the upper end thereof above the end portion of the cross bar, and each of the legs and the end portions of the cross bars including passages therethrough in which an actuating rod extends operatively connecting the latch of the leg with the handle thereof such that the handle can be moved for operatively moving the latch between the latched and the unlatched positions, the passages through the end portions of the cross bar each having a sufficient longitudinal extent such that the rods are movable longitudinally therethrough as the legs are moved longitudinally along the end portions, respectively.

19. The quick hitch of claim 18, further comprising cooperatively engageable elements on the legs and on the cross bar for fixing the legs at the two positions on the cross bar, respectively, the cooperatively engageable elements each including sets of transverse holes at predetermined locations through the upper portions of the legs and through the end portions of the cross bar for receiving bolts or pins therethrough.

20. The quick hitch of claim 18, wherein when the legs are positioned at the first position on the cross bar inner edges of the hooks are spaced longitudinally between about 960 mm and about 980 mm apart for coupling to pins of a work element spaced apart in a first configuration, and inner edges of two of the connectors are spaced longitudinally between about 820 mm and about 840 mm apart for connection to lift arms spaced apart in a second configuration closer together than the first configuration.

* * * * *